United States Patent

[11] 3,602,214

[72] Inventors Seymour B. London;
Rose E. London, both of 35 E. DiLido Drive, Miami Beach, Fla. 33139
[21] Appl. No. 860,326
[22] Filed Sept. 23, 1969
[45] Patented Aug. 31, 1971
Continuation-in-part of application Ser. No. 710,485, Mar. 5, 1968.

[54] METHOD OF PHANTOM LEVEL SENSING IN A CENTRAL VENOUS PRESSURE MONITORING SYSTEM
7 Claims, 3 Drawing Figs.

[52] U.S. Cl. .................................................. 128/2.05 D
[51] Int. Cl. ............................................... A61b 5/02
[50] Field of Search .......................................... 128/2.05 A, 2.05 D, 2.05 G, 2.05 M, 2.05 N, 2.05 Q, 2.05 R, 2.05 V, 214, DIG. 13; 33/46; 73/401, 402

[56]               References Cited
         UNITED STATES PATENTS
3,273,447   9/1966   Frank .......................... 128/2.05 D
3,456,648   7/1969   Lee et al. .................... 128/2.05 D
3,495,585   2/1970   Halligan et al. ............. 128/2.05 D Primary Examiner—William E. Kamm
Attorney—David H. Semmes ABSTRACT: Method of sensing phantom level in central venous pressure monitoring systems of the type supporting liquid in column relatively to the right atrial chamber of the heart. The method includes projecting of a reference light beam from the liquid column gravimetric zero reference point to the right atrial chamber gravimetric zero point referenced on the patient's thorax. The light beam shining upon the thorax enables readjusting of the height of the liquid column, accordingly as the reference beam is projected above or below the referenced point on the thorax.

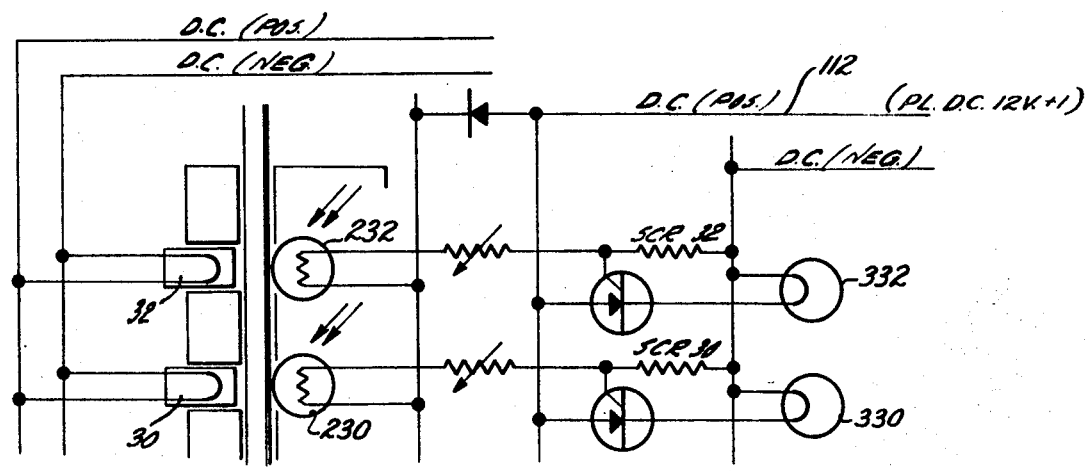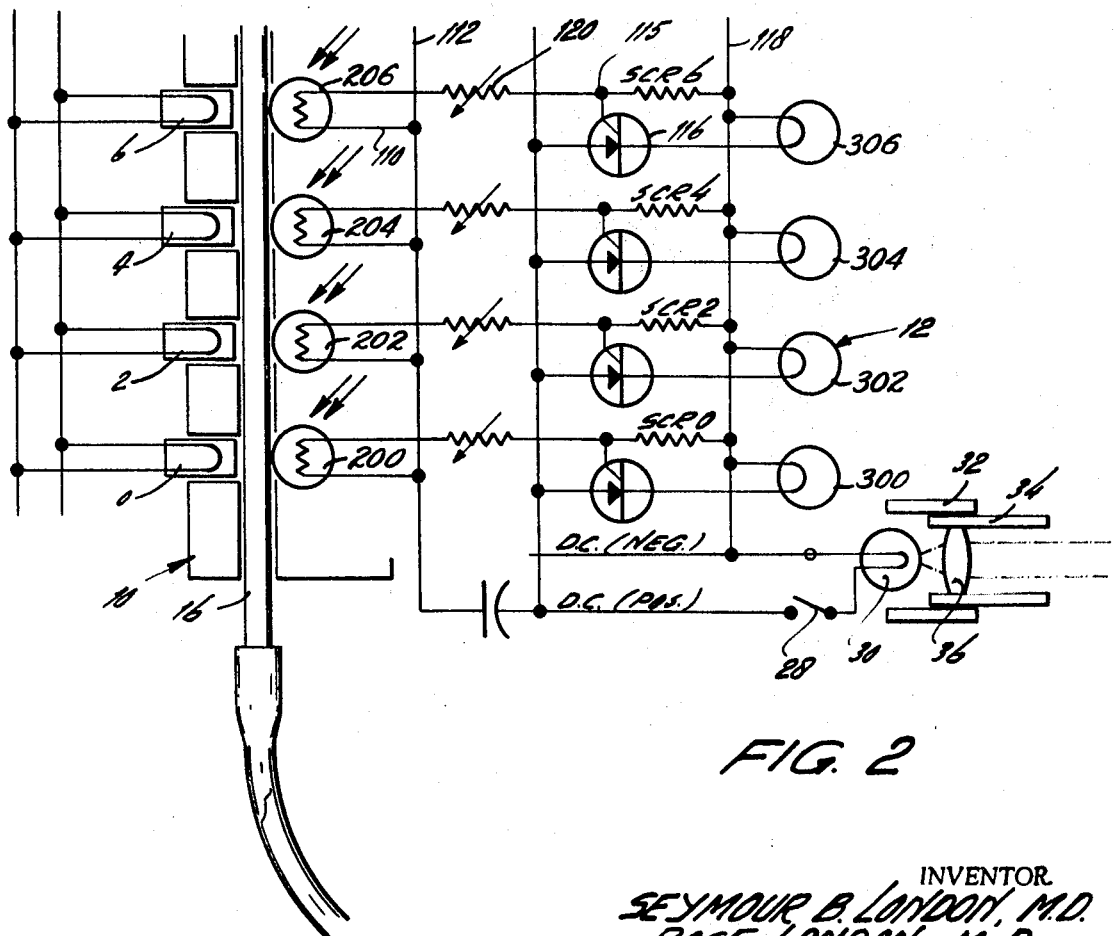
FIG. 2
INVENTOR.
SEYMOUR B. LONDON, M.D.
ROSE LONDON, M.D.
David H. Semmes
ATTORNEY

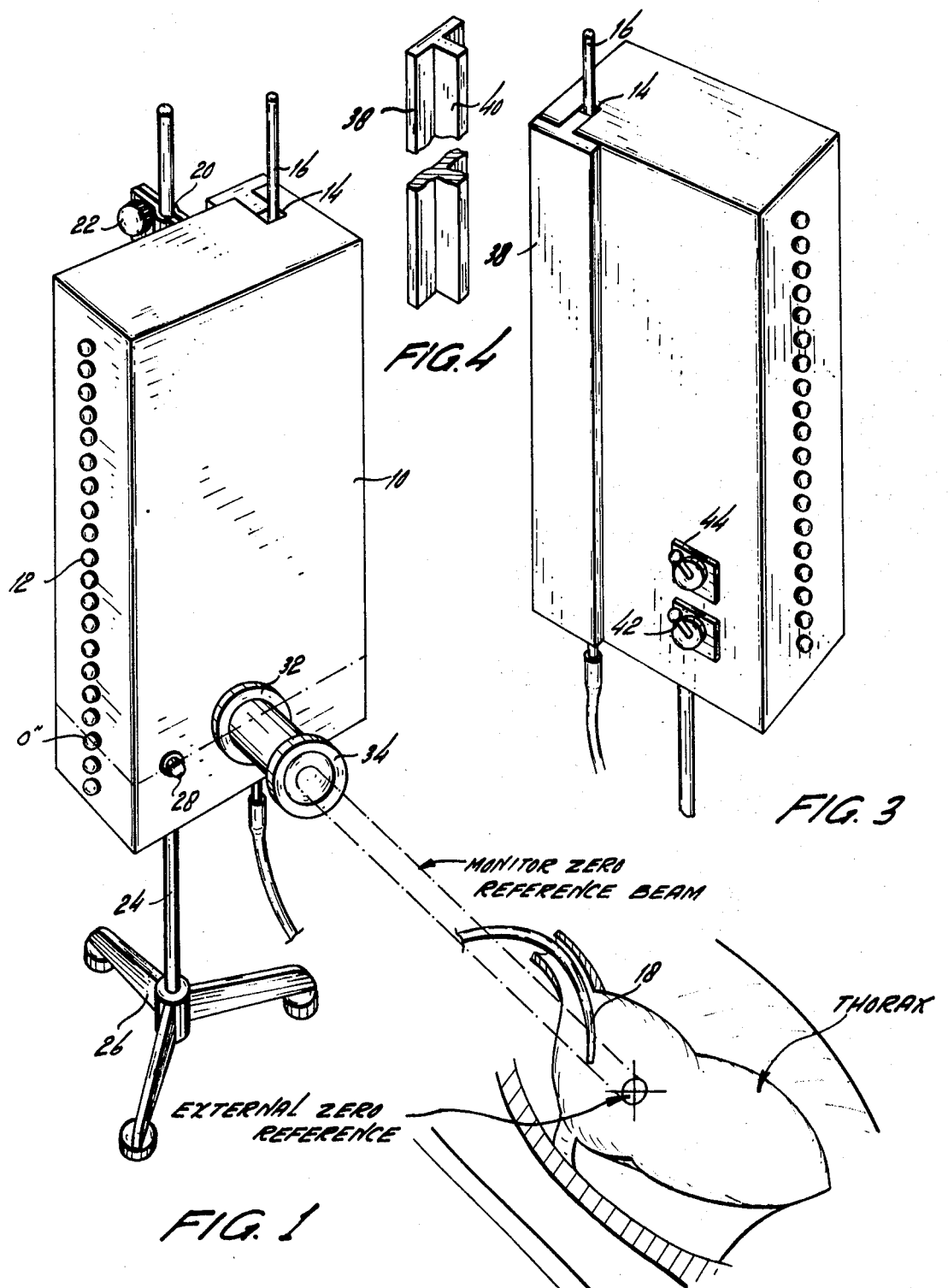

METHOD OF PHANTOM LEVEL SENSING IN A CENTRAL VENOUS PRESSURE MONITORING SYSTEM

CROSS-REFERENCES TO RELATED APPLICATIONS

A continuation-in-part of: "Method for Central Venous Pressure Monitoring" (Ser. 710,485), filed Mar. 5, 1968. In the parent application there was disclosed a method of central venous pressure monitoring, wherein liquid was supported in a vertical column by means of central venous pressure and venous pressure was monitored as a function of the liquid level in the column. Additionally, various audio and visual alarms were built into the system.

The present invention is directed to the technique for sensing phantom level or correlating the gravimetric zero reference of the liquid column with respect to gravimetric zero in the right atrial chamber.

BACKGROUND OF THE INVENTION

1. Field of the Invention

Central venous pressure monitoring (CVP) is being undertaken increasingly as an index of the effectiveness of the heart in handling the venous blood flow presented at the right atrium. A higher than normal CVP suggests that the central veins are relatively overdistended and that the heart cannot effectively keep them "empty." A low CVP indicates simply that the heart is effectively maintaining a forward flow and that the veins are relatively undistended. In CVP monitoring the liquid supported in column as an index to CVP is required to be indexed or zero referenced with respect to the right atrial chamber into which the plastic catheter or tube is introduced.

2. Description of the Prior Art

Pertinent prior art includes:

| | |
|---|---|
| Still | 3,043,303 |
| Baehr | 3,287,721 |
| London | 3,202,148 |
| London | 3,319,633 |

Still shows the use of a catheter probe device for blood sample withdrawal. Baehr has an adjustable device for the gravity feeding of prescribed amounts of fluid by means of a catheter tube, pinching clamp and an electronic signal circuit. The London patents concern measuring blood pressure by means of a sound detecting pressurized cuff and energizing a mercury column or aneroid manometer for transmittal of detected Korotkow sounds onto a visual display panel.

Conventionally a carpenter's spirit level has been used to determine the relationship between the manometer zero and the zero reference point in the chest. However, manipulation of the level is awkward, time-consuming and often inaccurate. The present method eliminates the necessity for manual handling and enables sensing of phantom level directly through the manometer unit.

SUMMARY OF THE INVENTION

According to the present invention; sensing of phantom level in a central venous pressure monitoring system is accomplished by projecting a light beam through these gravimetric zero reference of the manometer column onto the right atrial chamber, referenced as an "X" or cross mark on the thorax of the patient. As the light beam zero reference is above or below the "X" marked on the patient's body the entire manometer unit may be readily readjusted in height, so that there is parallel gravimetric zero reference between the right atrial chamber and manometer column. As the patient's body is moved, phantom level may be again sensed and the column readjusted to compensate for differences in the height of the right atrium.

BRIEF DESCRIPTION OF THE DRAWINGS

FIG. 1 is a perspective view of a proposed central venous pressure monitor housing the manometer column gravimetric zero reference being shown in dotted lines and indexed to the right atrium by means of a laterally projected light beam;

FIG. 2 is a fragmentary circuit diagram of the proposed central venous pressure monitoring system and its phantom level sensing component;

FIG. 3 is a fragmentary perspective of the central venous pressure housing rear, showing the shielding of the liquid column from ambient light and various monitoring controls; and FIG. 4 is a perspective view of the obturator shield shielding the sensing column from ambient light conditions.

DESCRIPTION OF THE PREFERRED EMBODIMENTS

Zero reference on the exterior of the chest wall is the gravimetric zero of the CVP analogous to the position of the right atrium in the chest. There is no uniformly accepted method for determining external zero reference, although probably the difference between methods may be less than the differences between CVP values in normal persons of 0 to 100 mm. $H_2O$. Various zero points have been suggested—a point 5 cm. posterior to the fourth costochondral junction, or 10 cm. anterior to the surface of the back, or 12 cm. from the top of the table. We have found a very satisfactory and simple method for uniformly locating zero reference applicable to bedside monitoring. A line is extended laterally from the fourth costochondral junction until it intersects the anterior axillary line. After this point, the external zero reference is determined and marked, and the monitor zero is adjusted to this horizontal level and readjusted whenever the position of the patient is changed.

In FIG. 1 a central venous pressure monitor housing 10 is shown supported adjustably by brackets 20 and thumbscrews 22 upon vertical stand 24, having radially extending feet 26. The liquid filled sensing column 16 is positioned within slot 14 and extends via catheter or probe into the right atrial chamber. A source of saline solution or like fluid (not illustrated) may be connected to bottom of column 16. Column 16 is supported intermediate a vertical series of exciter lamps "0" to "32" and corresponding photosensitive cells PC "200" to PC "232," the latter being connected to indicator lamps "300" through "332." As the photocells sense light which has been transmitted through liquid in column 16, "0" through "32" the corresponding indicator lamps are illuminated. On-off switch 44, as well as lamp switch 42 may be employed, together with low level and a high level alarm switches (not illustrated).

The tube 16 is shielded from ambient light by means of "T" shaped obturator member 38 having longitudinal rib 40 which presses against the lateral surface of tube 16, as illustrated in FIG. 3.

In FIG. 2 there is illustrated the fragmentary portion of the circuitry, column 16 being supported intermediate exciter lamps "0," "2," "4," "6," etc. and corresponding photocells "300, 302, 304, 306." The photocells are gated to corresponding silicon rectifiers (SCR "0," etc.).

Each photocell (PC) e.g. "232" is connected by one terminal 110 to a positive voltage source 112, (PC DC 12V+1) and by the other ("SCR"), a solid state switch 116. The increased current through the photocell 32 that occurs in the presence of increased light transmission is used to trigger these switches. Precise regulation in the amount of current flow in the "standby" condition is further controlled by a small reverse bias of negative current applied through line 118 to the SCR gate 115 and by a potentiometer 120, reducing the current optimally to the SCR gate 115. This insures that each indicator lamp circuit is triggered only if the transilluminated plastic column 116 is filled by saline to the vertical height of the paired photocell-exciter lamp circuit. SCR switches 116 are turned on and off 60 times a second when used with alternating current, as long as there is positive direct current bias to the SCR gate 115. As the central venous pressure fluctuates, the saline column will rise and fall and, accordingly, the indicator lamps will be illuminated or extinguished because of this changing bias produced by the increase or decrease in light transmission through the saline filled column.

The phantom level sensing component includes lamp 30 supported at one end of base 32 and extensible lens holding element 34, supporting lens 36 adjustably with respect to lamp 30.

The adjacent pushbutton switch 28 triggers the zero reference beam which, as illustrated in FIG. 1 is superimposed on the external cardiac reference "X" by vertically raising or lowering housing 10 upon stand 24. When the zero reference beam coincides with the external reference to the right atrium of the heart, "X," the gravimetric zero of the monitor coincides with gravimetric zero level of the heart and pressures in the central venous pressure monitor will reflect the gravimetrically true pressure within the right atrial chamber, i.e. the central venous pressure.

Manifestly, variations in circuitry, focusing and housing can be employed without departing from the spirit of the invention.

We claim:

1. Method of phantom level sensing in a central venous pressure monitoring system comprising:
    A. supporting liquid in vertical column by means of central venous pressure;
    B. projecting a zero reference light beam from the foot of said column and onto a patient's chest wall adjacent the right atrial cardiac chamber as an index of the height of said liquid in vertical column with respect to the right atrial cardiac chamber;
    C. transmitting light through said column and said liquid;
    D. discriminately sensing that light which has been transmitted through the liquid; and
    E. monitoring venous pressure as a function of the level of liquid in said column through which light is transmitting.

2. Method of phantom level sensing in a central venous pressure monitoring system comprising:
    A. supporting liquid in vertical column by means of central venous pressure;
    B. making the patient's thorax as an external reference point corresponding to the right atrial cardiac chamber;
    C. projecting a zero reference light beam from the foot of said column and onto the reference point, as an index of the height of said liquid in vertical column with respect to the right atrial cardiac chamber;
    D. transmitting light through said column and said liquid;
    E. discriminately sensing that light which has been transmitted through the liquid; and
    F. monitoring venous pressure as a function of the level of liquid in said column through which light is transmitting.

3. Method of phantom sensing in a central venous pressure monitoring system as in claim 2 including:
    G. vertically repositioning said column relatively to the difference in height between said light beam and said external reference point corresponding to the right atrial cardiac chamber, as the position of the patient may be changed.

4. Method of phantom level sensing in a central venous pressure monitoring system as in claim 2, wherein the gravimetric zero of the liquid in column coincides with the foot of said column and is equal to right atrial pressure.

5. Method of phantom level sensing in a central venous pressure monitoring system as in claim 4 including:
    H. supporting said liquid in column intermediate a series of vertically disposed light sources and a corresponding series of vertically disposed photosensing cells, corresponding to gravimetric pressure levels in said column.

6. Method of phantom level sensing in a central venous pressure monitoring system as in claim 3 including focusing while projecting said zero reference light beam, so as to define said light beam upon the thorax reference point.

7. Method of phantom level sensing in a central venous pressure monitoring system as in claim 5 including:
    I. shielding of said liquid column from ambient light.